(12) United States Patent
Deshpande et al.

(10) Patent No.: US 6,975,621 B2
(45) Date of Patent: Dec. 13, 2005

(54) METHOD TO OPTIMALLY SELECT BANDWIDTH AND PRIORITY FOR VOICE MESSAGE PACKETS IN A VOICE OVER IP NETWORK

(75) Inventors: Raj Deshpande, Hoffman Estates, IL (US); Roger Ady, Chicago, IL (US); Chris Bach, Elgin, IL (US)

(73) Assignee: Motorola, Inc, Horsham, PA (US)

( * ) Notice: Subject to any disclaimer, the term of this patent is extended or adjusted under 35 U.S.C. 154(b) by 849 days.

(21) Appl. No.: 09/812,994

(22) Filed: Mar. 20, 2001

(65) Prior Publication Data

US 2003/0012203 A1    Jan. 16, 2003

(51) Int. Cl.[7] .............................................. H04L 12/66
(52) U.S. Cl. ...................... 370/352; 370/357; 370/389; 370/395.42
(58) Field of Search ...................... 370/395.31, 395.42, 370/401, 410, 477, 522, 352–359, 259, 468, 370/230.1, 236.1, 299, 455, 912, 389, 902, 370/60.1; 379/272–277, 221.01, 16, 17, 221.9, 379/225, 229, 67.1, 84, 88.23, 88.25, 230–234, 379/207.05–207.09, 219, 100.09, 93.01, 379/100.12, 114.01–114.1, 201.01, 65; 709/238–244; 711/221; 455/54.2, 420, 463, 435, 554, 445, 455/438, 414

(56) References Cited

U.S. PATENT DOCUMENTS

| | | | | |
|---|---|---|---|---|
| 5,341,374 A | * | 8/1994 | Lewen et al. | 370/450 |
| 5,621,727 A | * | 4/1997 | Vaudreuil | 370/401 |
| 5,740,231 A | * | 4/1998 | Cohn et al. | 379/88.22 |
| 5,872,779 A | * | 2/1999 | Vaudreuil | 370/352 |
| 5,940,478 A | * | 8/1999 | Vaudreuil et al. | 379/88.18 |
| 6,064,723 A | * | 5/2000 | Cohn et al. | 379/88.14 |
| 6,157,648 A | * | 12/2000 | Voit et al. | 370/401 |
| 6,252,952 B1 | * | 6/2001 | Kung et al. | 379/114.1 |
| 6,289,010 B1 | * | 9/2001 | Voit et al. | 370/352 |
| 6,292,481 B1 | * | 9/2001 | Voit et al. | 370/352 |
| 6,295,292 B1 | * | 9/2001 | Voit et al. | 370/352 |
| 6,363,065 B1 | * | 3/2002 | Thornton et al. | 370/352 |
| 6,373,817 B1 | * | 4/2002 | Kung et al. | 370/217 |
| 6,570,855 B1 | * | 5/2003 | Kung et al. | 370/237 |
| 6,618,600 B1 | * | 9/2003 | Chow et al. | 455/567 |
| 6,633,635 B2 | * | 10/2003 | Kung et al. | 379/215.01 |
| 6,671,262 B1 | * | 12/2003 | Kung et al. | 370/260 |
| 6,678,265 B1 | * | 1/2004 | Kung et al. | 370/352 |
| 6,680,935 B1 | * | 1/2004 | Kung et al. | 370/352 |
| 6,687,360 B2 | * | 2/2004 | Kung et al. | 379/211.02 |
| 6,690,675 B1 | * | 2/2004 | Kung et al. | 370/401 |
| 6,728,239 B1 | * | 4/2004 | Kung et al. | 370/352 |
| 6,768,722 B1 | * | 7/2004 | Katseff et al. | 370/260 |
| 6,775,267 B1 | * | 8/2004 | Kung et al. | 370/352 |
| 6,775,273 B1 | * | 8/2004 | Kung et al. | 370/356 |
| 2003/0108176 A1 | * | 6/2003 | Kung et al. | 379/211.02 |
| 2003/0133558 A1 | * | 7/2003 | Kung et al. | 379/215.01 |

* cited by examiner

*Primary Examiner*—Wellington Chin
*Assistant Examiner*—Jamal A. Fox
(74) *Attorney, Agent, or Firm*—Lawrence T. Cullen (57) ABSTRACT

A method of, and means for accomplishing the method, optimizing system resources in a network (102) using packetized voice telephony consists of the following steps: determining (302) that a packetized voice call from an originating gateway (104) terminates at a non-human voice interface system (108), wherein the packetized voice call is assigned a specified high priority level; and transmitting (304) signaling to cause the originating gateway (104) to transmit the packetized voice call to the non-human voice interface system (108) at a lower priority than the specified high priority level.

12 Claims, 4 Drawing Sheets

METHOD TO OPTIMALLY SELECT BANDWIDTH AND PRIORITY FOR VOICE MESSAGE PACKETS IN A VOICE OVER IP NETWORK

FIELD OF THE INVENTION

The present invention relates to packetized voice networks, and more specifically to packet prioritization over packet networks. Even more specifically, the present invention relates to optimizing bandwidth and priority selection for voice message packets in packet networks, such as Voice over Internet Protocol (VoIP) networks.

BACKGROUND OF THE INVENTION

Circuit-switched networking has traditionally been used in telephony systems. In such circuit switched systems, a dedicated connection or physical path is established for a telephone call, the connection lasting the duration of the telephone call Voice communications over this dedicated connection provide real time connections, such as conventionally known person-to-person telephone calls.

In recent years, packet networks, such as Internet Protocol (IP) networks, have been used for the transport of data. These packet networks transmit data by segmenting the data into packets which are sent according to the priority of the data within the packets; thus, the individual packets are prioritized. At the receiving end, these packets are reassembled according to the assigned priority to reconstruct the data. Packet networks are conveniently able to transport data without having to create a dedicated connection between a originating gateway and a terminating gateway of the packet network; thus, providing an efficient use and allocation of network bandwidth.

Packet networks are recently being developed to transport voice data via packets, such as using Voice over Internet Protocol (VoIP), in addition to transporting data, i.e., providing multi-media data transport. The efficiency and flexibility of packet networks has made this technology very attractive for telecommunication and Internet service corporations throughout the world. Packetized data transport is highly dependent on packet prioritization to accomplish multi-media data transport effectively.

Current packet networks support multiple tiers of service types for the voice data transport. Each of these service types requires a relative guarantee of bandwidth matching the subscriber service type. A typical packet data voice call has two attributes: (1) the type of compression during the analog-to-digital conversion and (2) the priority the packets are sent. The type of subscriber is determined by these two attributes. A premium subscriber is guaranteed bandwidth irrespective of network resource conditions. A non-premium subscriber is allocated network resources on the best effort.

In most packet networks, voice packets are assigned the highest priority in order to ensure that the voice call occurs in real time. However, a significant number of subscribers use voice messaging services for unanswered voice calls to the subscriber. Voicemail has become a ubiquitous tool in businesses and is increasingly prevalent in many private residences and with wireless subscribers. For example, a voice call over the packet network is transported to a subscriber with the packets assigned the highest priority As such, when a packetized voice call goes unanswered, the voice call is re-routed to a voice messaging system (VMS), the voice packets having the same priority. The amount of voice messaging traffic is significant in most networks due to high voicemail subscription rates and the fact that the average voicemail message lasts about 2 minutes. Disadvantageously, transporting these voice calls to the voice messaging systems using the highest priority level results an inefficient use of network bandwidth since it is not necessary that these voice messaging systems receive the packetized voice calls in real time

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

The present invention advantageously addresses the needs described above as well as other needs by providing methods of optimization of network resources when a packetized voice call assigned a real-time priority level in a packet network, such as an IP network, terminates at, for example, at a voice messaging system.

In one embodiment, the invention can be characterized as a method of, and means for, optimizing system resources in a network using packetized voice telephony including the steps of: determining that a packetized voice call from an originating gateway terminates at a non-human voice interface system, wherein the packetized voice call is assigned a specified high priority level; and transmitting signaling to cause the originating gateway to transmit the packetized voice call to the non-human voice interface system at a lower priority than the specified high priority level.

Figure 1:
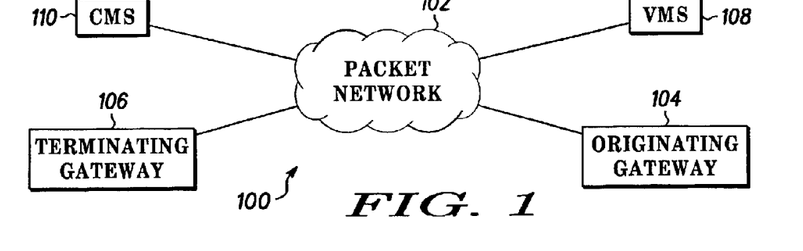
FIG. 1 is a system level diagram of a communication system including a packet network for transporting packetized voice calls in accordance with one embodiment of the invention.

In another embodiment, the invention can be characterized as a method of, and means for, optimizing system resources in a network using packetized voice telephony including the steps of: receiving an indication that a packetized voice call has terminated at a non-human voice interface system, wherein the packetized voice call is assigned a specified high priority level; re-prioritizing the packetized voice call to a lower priority level than the specified high priority level; and transmitting the packetized voice call to the non-human voice interface system at the lower priority level Referring first to FIG. 1, a system level block diagram is shown generally illustrating a communication system in accordance with one embodiment of the invention. Shown is the communication system 100 including a packet network 102, an originating gateway 104, a terminating gateway 106, a voice messaging system 108 (also referred to as VMS 108 and generically referred to as a "non-human voice interface system"), and a call management system 110 (also referred to as the CMS 110).

According to one embodiment of the invention, a method is proposed in which voice calls from the originating gateway to the terminating gateway that actually terminate on a voice messaging system are reprioritized to a lower priority than if the voice call were a true person-to-person call (i.e., the call was established between a subscriber at the originating gateway 104 and a subscriber at the terminating gateway 106). This method provides for the optimization of bandwidth and network resources in a packet network 102 that transports packetized voice calls. Additionally, such reprioritized voice calls may also be compressed with a suitable compression standard (or an alternative compression standard) for transmission to the voice messaging system.

As described above, in a packet network 102, such as an Internet Protocol (IP) network, voice telephony calls are segmented into digital packets and transmitted from the originating gateway 104 to the terminating gateway 106 via the packet network. These voice packets have two attributes: (1) the type of compression during the analog-to-digital conversion and (2) the priority the packets are sent. The type of subscriber is determined by these two attributes. A premium subscriber is guaranteed bandwidth irrespective of network resource conditions. A non-premium subscriber is allocated network resources on the best effort. In most packet networks, voice packets are assigned the highest priority in order to ensure that voice call occurs in real time.

As such, when a voice call is placed from a subscriber at the originating gateway 104 to a subscriber at the terminating gateway 106 and the voice call is not answered within the prescribed number of rings, the call management system 110 causes the voice call to be re-routed to a non-human voice interface system, e.g., the voice messaging system 108. In this embodiment, the call management system 110 (CMS) is responsible for all call treatments within the packet network. The CMS 110 controls the process of the assignment of priorities for packets traveling over the packet network 102. The CMS 110 re-routes the packetized voice call to the voice messaging system 108 only if the subscriber at the terminating gateway 106 has requested and subscribed for such a service. As described above, such voice calls are sent as packets of voice data over the packet network 102. The speed at which the packets arrive at the destination is determined by the priority assigned to the individual packets. Voice data is commonly assigned a specified high priority level, which is usually the highest priority level (e.g., a real-time priority level), in order to ensure that the voice packets arrive to appear substantially in real time. Disadvantageously, when the packetized voice call is conventionally re-routed such that it terminates at the voice messaging system 108, the voice packets are still transported through the packet network 102 according to the same high priority. This results in wasted system resources since such voice packets do not need to be sent in the highest priority because a "machine" is listening to the packetized voice call, not a human.

Therefore, in accordance to one embodiment of the invention, when a back office application within the CMS 110 detects that the voice call is not answered at the terminating gateway 106, instead of simply signaling the voice call to be re-routed to terminate at the voice messaging system, 108, the CMS 110 initiates signaling to cause the packetized voice call to be re-routed to the terminating VMS 108 (in alternate embodiments described further below, the VMS 108 initiates the signaling to reprioritize the voice call), but the packetized voice call is transported at a lower priority. This embodiment of the invention may apply in any case where a packetized voice data is transported that is not received by a human listener. As such, the need for such packets to be received and assembled in real time is eliminated.

Furthermore, a packetized voice call assigned a high priority may be reprioritized and sent at a lower priority whenever the packetized voice call terminates at a "non-human voice interface system". A non-human voice interface system is any device capable of being the terminating end of a voice call from an originating gateway 104, such that the voice call is between a human subscriber at the originating gateway 104 and a non-human machine at the terminating end. In one embodiment, the non-human interface system comprises a voice messaging system 108 as is well known in the art. In another embodiment, the non-human interface system comprises an "interactive voice response system". An interactive voice response system is a system which prompts the subscriber at the originating gateway 104 for information. For example, a subscriber at an originating gateway initiates a voice call to place an order for airline tickets and the voice call is routed to an interactive voice response system. The interactive voice response system may play a recording asking "To what city would you like to fly?" In response, the person would respond with the name of a city. Since the terminating party is not a human and does need to receive the voice packets containing the persons answer in real time, the voice packets containing the response may be sent at a lower priority than a true person-to-person voice call over the packet network 102. However, it is important to note that the lower priority level assigned to the voice packets should not be such low priority that it would cause the interaction with the interactive voice response system to be awkward. For example, if the voice packets take too long to arrive, the interactive voice response system may think that the user has not responded within a time allowed for response. Alternatively, the user responds and then has to wait a period of time for the response to be received and at the interactive voice response system and the next question to be posed to the user. Such users may become frustrated and discontinue usage of the interactive voice response system. Thus, the specific priority level that such voice packets terminating at an interactive voice response system are re-prioritized to will need to be considered in view of the quality of interaction intended for the user. Such interactive voice response systems are well known in the art.

The communication system 100 of FIG. 1 is intended to be a very general case. As such, the VMS 108 is actually part of the packet network; however, in some embodiments, the VMS is actually part of another network, such as a circuit switched network (e.g., a Public Switched Telephone Network or PSTN) and is coupled to the packet network 102 via a media gateway (not shown) coupling the circuit switched network to the packet network 102. Furthermore, in some embodiments, although the originating gateway 104 and the terminating gateway 106 are part of the packet network 102, one or more of the originating gateway 104 and the terminating gateway 106 may be coupled to the packet network 102 via an access network (not shown). One example of such a system is described with reference to FIGS. 4 through 6, in which the VMS is coupled to a circuit switched network, i.e., PSTN, which is coupled to the packet network 102 via a media gateway. Additionally, in the embodiments of FIGS. 4-6 below, the access network coupling the originating and terminating gateways 104 and 106 to the packet network 102 is a hybrid fiber/coax network, as is known in the art. Such embodiment is only one specific example of a system which may apply the principles of this embodiment of the invention. For example, the access network that couples one or more of the originating gateway 104 and the terminating gateway 106 to the packet network 102 may be any wireline or wireless network, e.g., a fixed location wireless radio or optical system. Additionally, the communication links within such a wireless access network are not required to be relatively time invariant, as in a hybrid fiber coax network. As such, the access network may be a mobile wireless network, such as a satellite or cellular-based wireless network. In further embodiments, the packet network 102 may also comprise the access network itself.

As another example, the packet network 102 may comprise a digital cellular network. In such a digital cellular packet network, air bandwidth is scarce, such that the re-prioritization techniques of several embodiments of the invention would advantageously increase the available bandwidth and system resources for high priority voice calls when a voice call terminates at a non-human voice interface system, such as the voice messaging system 108. For example, such prioritization system would be easiest to implement with a cell to cell call within the same cellular network, e.g., a call from one subscriber to another subscriber within a Sprint PCS network.

Regardless of the specific configuration of the communication system, this embodiment of the invention applies to packetized voice telephone calls that are transported in part over a packet network 102, such as an IP network, IP over ATM (Asynchronous Transfer Mode), IP over SONET (Synchronous Optical Network), IP over Ethernet, IP over DSL (Digital Subscriber Line), IP over wireless, and Voice over Internet Protocol (VoIP) network. However, the packet network 102 is any communication network that is packet switched, i.e., transmits multi-media data in the form of packets routed based upon header information, as opposed to circuit switched. Furthermore, these multi-media data packets are transported according to assigned priorities. These assigned priorities may be based upon the type of service the subscriber pays for or by the type of data, e.g., voice data is transmitted at a higher priority than a purely data transfer. Packetized voice calls are generally assigned the highest priority such that the voice call will appear in real time. However, upon the call management system 110 sensing that the voice call will terminate at a non-human voice interface system, e.g., voice messaging system 108, the packetized voice call is reprioritized to be sent at a lower priority level. This optimizes bandwidth such that network bandwidth is not wasted on data packets that are not required to be at a high priority; thus, creating additional bandwidth for other person-to-person voice calls and other high priority data or multi-media transfers.

In alternate embodiments employing a "distributed call signaling" system, the originating gateway 104 and the terminating gateway 106 handle the call setup and call signaling, while the CMS 110 merely functions to map gateways together within the packet network 102. As such, when a subscriber at the terminating gateway 106 does not answer the voice call, the terminating gateway 106 causes the voice call to be re-routed to the VMS 108 (one example of a "non-human voice interface system"), by signaling to the originating gateway 104 to communicate directly with the VMS 108. Thus, in this embodiment, it is the VMS 108 (not the CMS 110) that initiates the signaling to cause the originating gateway 104 to transmit the voice call at the lower priority level. In other words, the VMS 108 negotiates the prioritization of the voice call, not the CMS 110. Such a system is an example of Distributed Call signaling, in which a central server, e.g., the CMS 110, is used to map originating gateways 104 and terminating gateways 106, but the call signaling and setup handled by the gateways themselves (e.g., the originating gateway 104, the terminating gateway 106 and the VMS 108). This is in contrast to the embodiments described above where the CMS 110 coordinates and negotiates the voice call setup, i.e., centralized call signaling. Examples of centralized call signaling systems are PacketCable NCS and SGCP (Simple Gateway Control Protocol) and its derivatives (MGCP (Media GCP), XGCP (eXternal GCP), etc.), which are well known in the art. Examples of Distributed Call signaling systems are Packet-Cable DCS, H.323 and SIP (Simple Internet Protocol), which are well known in the art. Thus, the gateways in a distributed call signaling system are more intelligent than the centralized signaling gateway (e.g., the CMS 110). In operation, if the VMS 108 becomes the terminating gateway (when the terminating gateway 106 reroutes a voice call from the originating gateway 104 to the VMS 108), the VMS 108 will now determine that the incoming voice call is terminating at a non-human voice interface system (i.e., the VMS 108 itself) and initiate signaling such that the originating gateway 104 will transmit the voice call at a lower priority. In such alternate embodiments, the VMS 108 will also negotiate the compression of the voice call, if desired.

Employing the bandwidth optimization techniques in the distributed call signaling systems enables the VMS 108 to add intelligence specific to the way voicemail is handled. For example, the VMS 108 may prompt the user at the originating gateway 104 to enter a symbol (e.g., "#") to leave a regular, non-urgent message which is reprioritized at a lower priority as described above. Alternatively, the user may be prompted to enter a different symbol (e.g., "1#") to make the message urgent. In such case, the voice call may be transmitted at the highest priority (no bandwidth optimization) or at a slightly reduced priority level, but not as reduced as a non-urgent message. As such, the VMS 108 negotiates the reprioritization of the voice call while adding the ability to reprioritize the voice call in different ways according to the user's preference.

Figure 2:
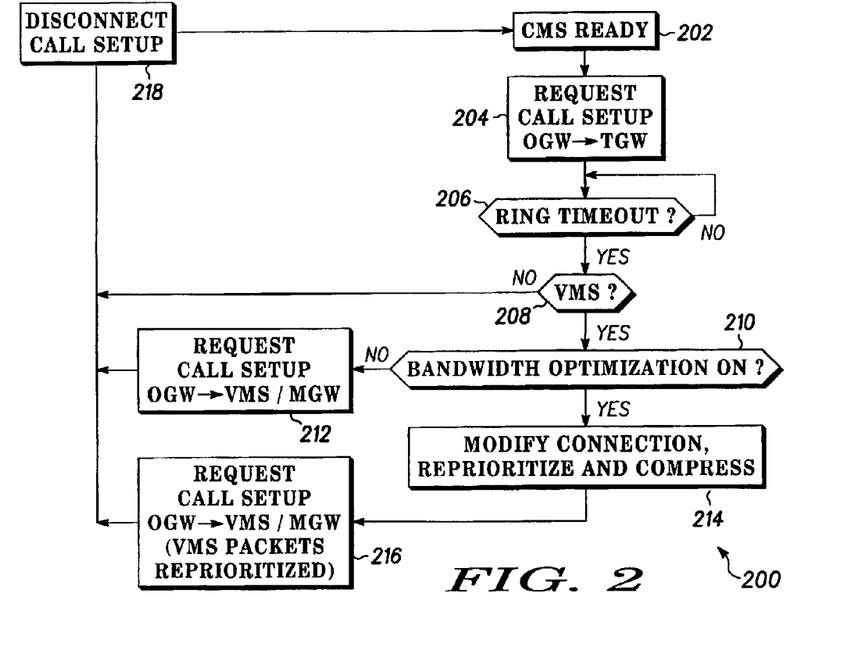
FIG. 2 is a functional block diagram of an algorithm performed by a call management system of the packet network of FIG. 1 in accordance with one embodiment of the invention.

Referring next to FIG. 2, a functional block diagram is shown of an algorithm 200 performed by a call management system of the IP network of FIG. 1 in accordance with one embodiment of the invention. As described above, the steps performed in the algorithm 200 of FIG. 2 are performed by a back office application within the CMS; however, such steps may be performed within other locations within the communication system 100 or by a network management device managing the call management system 110. Thus, the back office application is a set of instructions performed in software using a processor or similar machine to execute the instructions.

Initially, the call management system (e.g., CMS 110 of FIG. 1) is ready for operation (Block 202). Next, the CMS requests call setup procedures to initiate a voice call from the originating gateway 104 to the terminating gateway 106 (Block 204). This call setup procedure is entirely conventional. Next, the CMS 110 detects whether or not there has been a ring timeout (Block 206). In other words, the CMS 110 detects if the voice call is answered at the terminating gateway 106 or if the voice call is not answered within the prescribed number of rings. The CMS 110 keeps checking for a ring timeout until one occurs. If a ring timeout does not occur during the call setup procedure, the voice call proceeds as known in the art. Alternatively, the CMS may check for the absence of an offhook at the terminating gateway 106 within the prescribed number of rings.

Next, the CMS 110 determines if the subscriber at the terminating gateway 106 subscribes to a voice messaging system (Block 208), for example. As is well known in the art, this is typically performed by looking up the subscriber in a database that indicates if the subscriber subscribes to a voice messaging system, and if so, the number or address of the voice messaging system 108. If the subscriber does not subscribe to a voice messaging system, then the CMS 110 initiates signaling to disconnect the call setup procedure (Block 218), which is well known in the art, i.e., the voice call from the originating gateway 104 is ended. If the subscriber subscribes to a voice messaging system, the CMS 110 determines whether or not to use bandwidth optimization techniques or not (Block 210). The bandwidth optimization techniques are those as described in various embodiments of the invention.

If the bandwidth optimization techniques are not to be employed (Block 210), then the conventional call setup is requested from the originating gateway 104 to the voice messaging system 108 (Block 212). This functionality is entirely conventional and thus allows the subscriber at the originating gateway 104 to record a message for the intended subscriber at the terminating gateway 106 via the voice messaging system 108. Upon completion of the call from the originating gateway 104 to the voice messaging system 108, the CMS 110 initiates the proper signaling to disconnect the call setup (Block 218).

If the bandwidth optimization techniques are employed (Block 210), then the CMS 110 modifies the connection from the originating gateway 104 to the terminating gateway 106 (Block 214) by stopping the ringing at the terminating gateway 106 and disconnecting the connection between the originating gateway 104. The CMS 110 sends signaling to the originating gateway 104 to instruct it to reprioritize the transfer of the voice call, and in some embodiments, to compress the packetized voice call (Block 214). As such, the CMS 110 signals to the originating gateway 104 what priority level to assign the data packets representing the voice call. Advantageously, since the need for the voice call to occur in real time is removed, the voice call may be transported at a lower priority than as if the voice call were a true person-to-person voice call. Additionally, the voice call may be compressed, if not already compressed by the originating gateway 104. Alternatively, the type of compression, or the level of compression, may be altered in the new data path that will terminate at the voice messaging system 108. In embodiments employing adding or changing the compression, the CMS 110 sends signaling to the voice messaging system 108 in order to negotiate the appropriate compression standard. For example, the CMS 110 determines if the voice messaging system 108 has the appropriate decoder to decompress the voice call at the receiving end.

Next, after the CMS 110 causes the connection to be modified and the packetized voice call to be reprioritized and in some cases, compressed (Block 214), the CMS 110 requests call setup procedures from the originating gateway 104 to the voice messaging system 108, as is conventionally done. However, in accordance with this embodiment of the invention, the packetized voice call is transported at a lower priority level. Again, this conserves network resources and increases bandwidth for other high priority data transfers other person to person voice calls. Advantageously, this relieves congestion on such packet networks 102 due to the increasing subscriptions and use of non-human voice interface systems, such as voice messaging systems 108.

Additionally, in some embodiments, the bandwidth optimization techniques are automatically performed, as described above. As such, whenever a voice call is to terminate at a voice messaging system, then the voice call is automatically re-prioritized at a lower level priority. However, in some embodiments, the bandwidth optimization techniques may selectively occur. As such, the re-prioritization and optionally, the compression, may only happen for selected subscribers. Such selected subscribers may be those subscribers who pay for an additional service, or those selected within a subscriber pool as receiving high amounts of voicemail traffic, for example. These subscribers may be matched at the CMS 110 using databases, for example. Any number of selective standards may be used to select which subscribers out of a subscriber pool the bandwidth optimization techniques will apply. Thus, aside from the specific selection standard, the bandwidth optimization techniques may not automatically occur for all subscribers. Furthermore, feature that the bandwidth optimization techniques are selective may be enabled or disabled by the network management application attached to the CMS 110. Thus, in one embodiment, the network management application may toggle between one or more of the following states: no bandwidth optimization, automatic bandwidth optimization, or selective bandwidth optimization.

In alternate embodiments using a distributed call signaling approach rather than a centralized call signaling approach, where the gateways control the call setup and call handling (instead of the CMS), the VMS 108 initiates signaling to reprioritize the voice call and controls the call setup from the originating gateway to the VMS, the algorithm 200 remains essentially the same; however, different entities perform the steps of the respective Blocks in FIG. 2. The following represents one embodiment in a distributed call signaling system. Block 202 is the functionality of the CMS which provides a mapping of the originating gateway and the terminating gateway. The steps in Block 204 are performed by the originating gateway and the terminating gateway, while the steps of Blocks 206 and 208 are performed by the terminating gateway (e.g., terminating gateway 106), in that the terminating gateway determines that the subscriber has not answered the call and has knowledge of the VMS 108 that the subscriber subscribes to. Thus, the terminating gateway signals to the originating gateway to communicate with the VMS. Next, the step in Block 210 is performed by the VMS and the steps in Blocks 212 through 216 are performed by the VMS and the originating gateway. The VMS initiates the appropriate signaling to reprioritize (and optionally compress) the voice call to the originating gateway. The VMS and the originating gateway negotiate the call setup and other call signaling of the voice call between the originating gateway and the VMS. And the steps of Block 218 are performed by the originating gateway and the terminating gateway if "no" in Block 208, while the steps of Block 218 are performed by the originating gateway and the VMS if "yes" in Block 208.

It is noted that the functional steps of FIG. 2 are preferably performed by the call management system 110 that manages call treatment over a packet network 102. Again, as described above, this packet network 102 may comprise a variety of specific packet networks and may be coupled to circuit switched networks (e.g., a PSTN), and may also have one or more access networks, (e.g., a hybrid fiber/coax network) coupling the originating gateways and the terminating gateways to the packet network. Furthermore, the voice messaging system is one embodiment of a non-human voice interface system in which reprioritized voice calls may terminate. For example, an interactive voice response system is another embodiment of the non-human voice interface system.

Figure 3:
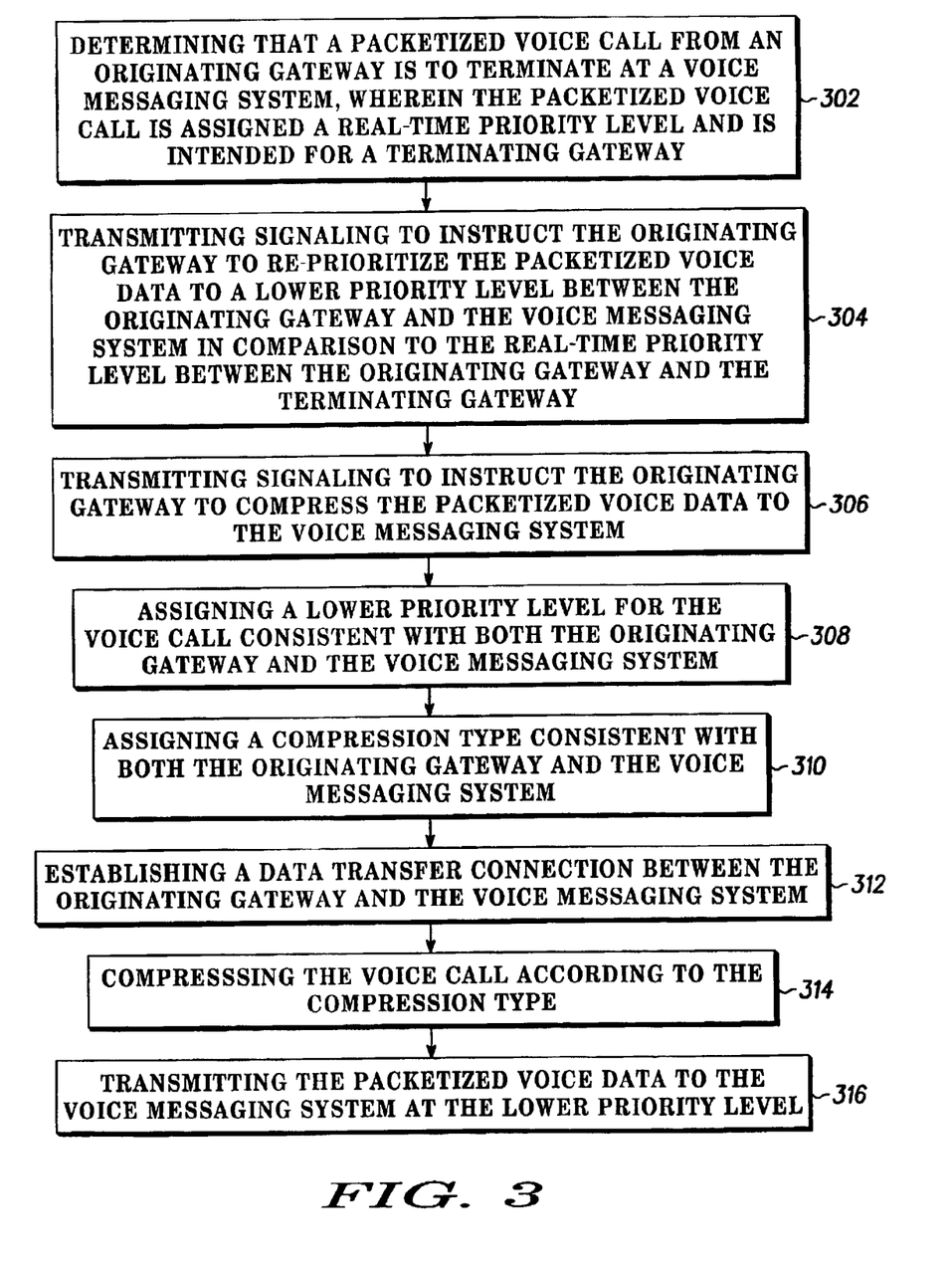
FIG. 3 is a flowchart of the steps performed in practicing one embodiment of the invention.

Referring next to FIG. 3, a flowchart is shown of the steps performed in practicing one embodiment of the invention. In one embodiment, the following steps are performed by various components of the system 100 of FIG. 1. A preliminary step is determining that a packetized voice call from an originating gateway 104 is to terminate at a voice messaging system, wherein the packetized voice call is assigned a real-time priority level and is intended for a terminating gateway 106 (Step 302). In one embodiment, this step is performed by the call management system 110 coupled to the packet network 102, since the call management system is responsible for all call treatment within the packet network 102. The next step is to transmit signaling to instruct the originating gateway 104 to re-prioritize the packetized voice data to a lower priority level between the originating gateway 104 and the voice messaging system 108 in comparison to the originally assigned real-time priority level between the originating gateway 104 and the terminating gateway 106 (Step 304). In accordance with other embodiments of the invention, signaling is then transmitted to instruct the originating gateway 104 to compress the packetized voice data to the voice messaging system 108 (Step 306). Again, in one embodiment, Steps 304 and 306 are also performed by the call management system 110 of the packet network 102. Furthermore, depending upon the embodiment, Steps 304 and 306 may occur automatically for all subscribers or selectively, as described above. As such, the originating gateway receives an indication (via the signaling) that the packetized voice call will terminate at the voice messaging system, as well as receives the appropriate signaling to for the originating gateway to reprioritize and optionally compress the voice call as to be transported to the voice messaging system.

Next, a lower priority level is assigned for the packetized voice call consistent with both the originating gateway 104 and the voice messaging system 108 (Step 308). This lower priority depends on the available priority levels as configured within a given packet network 102; however, the specific priority level assigned is of a lower priority level than would be assigned a normal person-to-person voice call. Also, in some embodiments, a compression type is assigned that is consistent with both the originating gateway 104 and the voice messaging system 108 (Step 310). For example, the call management system 110 checks with the voice messaging system to see if it includes an appropriate type decoder to decompress the data. Alternatively, if the voice call is already compressed, an alternative compression type may be assigned. Next, a data transfer connection is established between the originating gateway 104 and the voice messaging system 108 (Step 312), as is conventionally done. Next, according to some embodiments, the packetized voice call is compressed according to the compression type (Step 314). And finally, the packetized voice call is transmitted to the voice messaging system at the lower priority level (Step 316).

Figure 4:
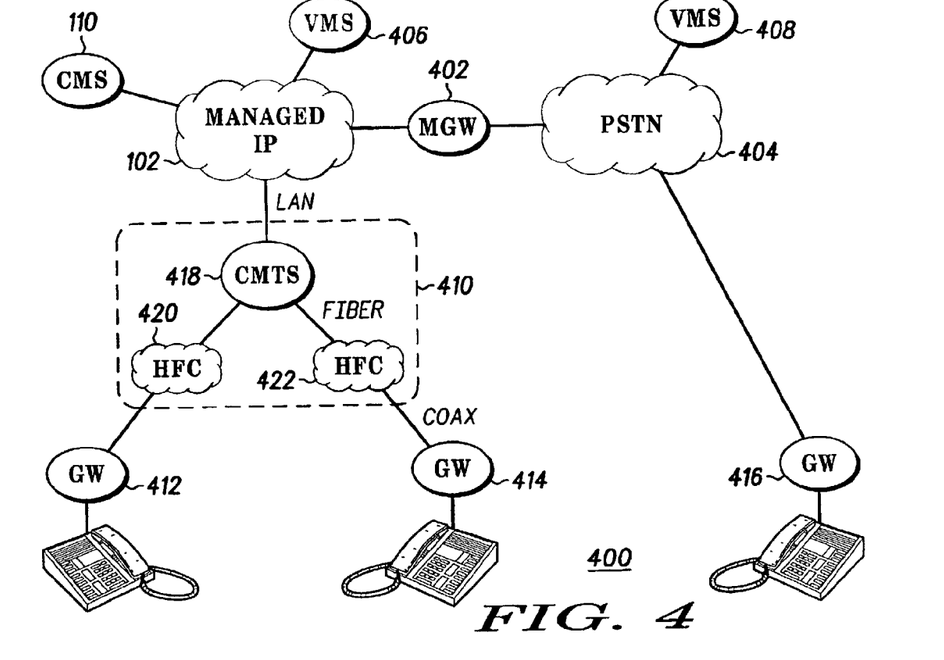
FIG. 4 is a system level diagram of one embodiment of the communication system of FIG. 1 including an Internet Protocol (IP) network having customer access via a hybrid fiber/coax (HFC) system.

The steps of the flowchart of FIG. 3 may be performed by many different systems, such as the communication system of FIG. 4 or, generally, the communication system of FIG. 1. Furthermore, it is noted that while the flowchart of FIG. 3 refers specifically to the packetized voice calls that terminate at a voice messaging system, generally, the packetized voice calls may be reprioritized and compressed in any case that a voice call terminates at a non-human voice interface, e.g., a voice messaging system. As described above, a non-human voice interface system is any device capable of being the terminating end of a voice call from an originating gateway, such that the voice call is between a human subscriber at the originating gateway and a non-human machine at the terminating end.

Furthermore, in alternate embodiments in a distributed call signaling system where the VMS is responsible for the call setup and reprioritization of the packetized voice call, instead of the CMS, the flowchart is the same although the steps are performed by different portions of the communication system. For example, in one embodiment, the VMS or the terminating gateway may perform Step 302 by determining that the voice call from the originating gateway is to terminate at a non-human voice interface system and that the voice call was intended for a subscriber at the terminating gateway. For example, the terminating gateway (e.g., terminating gateway 106) determines that the subscriber has not answered the call, that the subscriber subscribes to a VMS (a priori knowledge), and signals to the originating gateway to communicate with the VMS; thus, the terminating gateway has determined that the packetized voice call will terminate ant a non-human voice interface system (e.g., the VMS) Likewise, the VMS may make this determination (Step 302) in a variety of ways, for example, the VMS assumes that any call being re-routed from an originating gateway to the VMS by a terminating gateway is a packetized voice call that was intended for the subscriber at the terminating gateway. The VMS may also make the determination from the signaling received from the originating gateway (since in the distributed call signaling system, the gateways control call setup and call signaling). Furthermore, the VMS may also determine that the packetized voice call is a voice message intended for the subscriber at the terminating gateway by the prompts provided by the VMS to the user at the originating gateway and the responses the VMS receives from the user at the originating gateway. It is noted that not all calls between an originating gateway and the VMS are packetized voice calls that are intended to be messages for a subscriber of the VMS located at another gateway (i.e., a packetized voice call intended for a subscriber at the terminating gateway), for example, the call may be the subscriber trying to retrieve messages on the VMS. Thus, in one embodiment, the VMS performs Step 302, while in another embodiment, the terminating gateway performs Step 302. Next, in such embodiments, the VMS performs Steps 304 and 306, while the originating gateway performs Steps 308 and 310. Both the VMS and the originating gateway perform Step 312 while the originating gateway performs Steps 314 and 316.

It is noted that the methods of bandwidth optimization of several embodiments may be applied whenever a packetized voice call assigned specified high priority level terminates at a non-human voice interface system, such that the packetized voice call is caused to be reprioritized at a priority level lower than the specified high priority level.

Furthermore, the steps of FIG. 3 are typically performed as a set of instructions performed in software using a processor or similar machine within the respective gateway to execute the instructions that result in the accomplishment of the respective steps.

Referring next to FIG. 4, a system level diagram is shown of one embodiment of the communication system of FIG. 1 including an Internet Protocol (IP) network having customer access via a hybrid fiber/coax (HFC) system. Shown is a communication system 400 (also referred to as a multimedia network) including the packet network 102, a public switched telephone network 404 (also referred to as PSTN 404), a media gateway 402 (also referred to as MGW 402), the call management system 110 (also referred to as CMS 110), voice messaging systems 406 and 408 (also referred to as VMS 406 and VMS 408 and referred to generically as "non-human voice interface systems"), an access network 410, and gateways 412, 414 and 416 (also referred to as GWs 412, 414 and 416). In this embodiment, the access network 410 comprises a cable modem termination system 418 (also referred to as CMTS 418) and hybrid fiber/coax networks 420 and 422 (also referred to as HFCs 420 and 422).

The PSTN 404 is coupled to the packet network 102 via the media gateway 402. Voice messaging system 408 and gateway 416 are part of the PSTN 404 (shown as coupled to the PSTN 404). Voice messaging system 406, the call management system 110, and the access network 410 are part of the packet network 102 (shown as coupled to the packet network 102). Within the access network 410, the CMTS 418 is coupled to packet network 102. The hybrid fiber/coax networks 418 and 420 are part of the access network 410 and are coupled to the CMTS 418 via fiber links. And the gateways 412 and 414 are coupled to hybrid fiber/coax networks 418 and 420, respectively, via coaxial cable links.

In operation, according to one embodiment of the invention, a method is proposed in which voice calls that terminate on a voice messaging system are reprioritized to a lower priority than if the voice call were a true person-to-person call. This method provides for the optimization of bandwidth and network resources in a packet network that transports packetized voice calls. Additionally, such reprioritized voice calls may also be compressed with a suitable compression standard for transmission to the voice messaging system.

The system 400 of FIG. 4 represents a specific example of the communication system 100 of FIG. 1 in which the access network 410 couples one or more gateways to the packet network 102 and at another gateway 416 of the circuit switched network, i.e, PSTN 404, is coupled to the packet network 102 via media gateway 402. Furthermore, the non-human voice interface systems are illustrated as voice messaging systems 406 and 408, one of which (VMS 406) is part of the packet network 102 and the other (VMS 408) is coupled to the packet network 102 via the media gateway 402 and the PSTN 404.

Again, the packet network 102 may comprise any specific type of packet network in which voice calls are transported within data packets that are assigned a specific priority depending on the content of the data packet. For example, the packet network 102 is an Internet Protocol (IP) network and the voice calls are transported as data packets according to Voice over Internet Protocol (VoIP). Furthermore, as described above, the call management system 110 is responsible for all call treatment over the packet network 102. Thus, the communication system 400 is a specific example of the general case communication system 100 of FIG. 1 and may use several embodiments of the invention.

In operation, subscribers located at gateways 412, 414, and 416 may place telephone calls to each other, or to other subscribers within the packet network 102 or the PSTN 404. As shown, the media gateway 402 is the interface between the PSTN 404 and the packet network 102. As is understood in the art, the PSTN 404 is a circuit switched network, in which all connections are dedicated during the duration of a telephone call. On the other hand, the packet network 102, data is transported efficiently in packets, which are assembled at the terminating gateway. The speed at which the packets arrive is determined by the priority assigned to the individual packets. Voice data is commonly assigned the highest priority in order to ensure that the voice packets arrive to appear in real time. In accordance with several embodiments of the invention, when a packetized voice call terminates at a non-human voice interface system, the packetized voice call is reprioritized at a lower priority since such voice packets are no longer required to be received very close to real time, thereby providing a significant savings of network resources and bandwidth.

Figure 5:
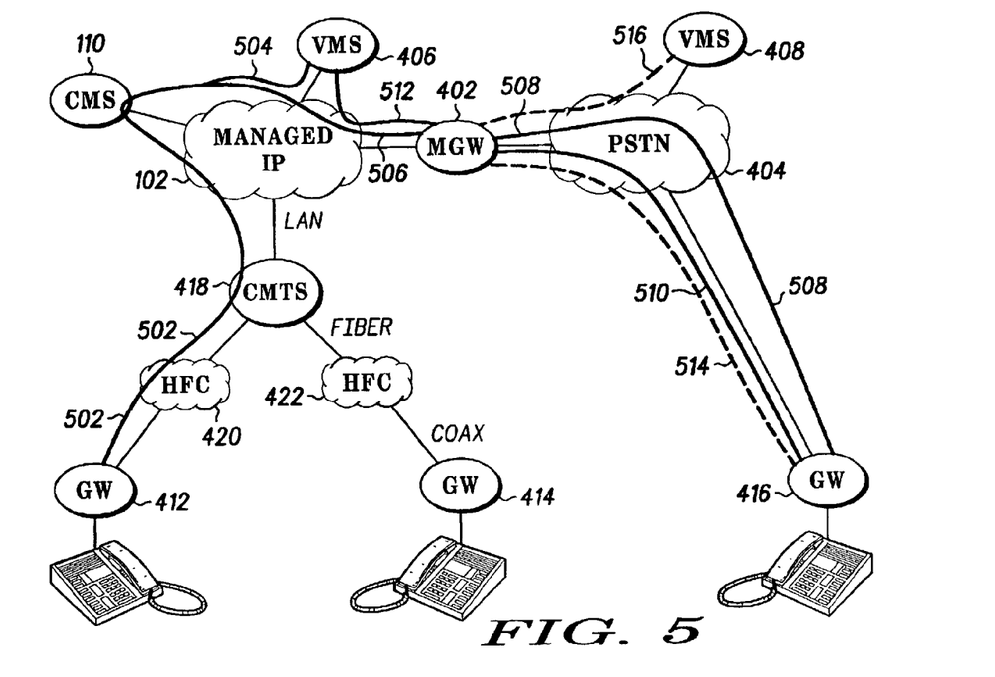
FIG. 5 is the system level diagram of FIG. 4 illustrating a call scenario from an originating gateway external to the IP network of FIG. 4 to a terminating gateway within the IP network in accordance with another embodiment of the invention.
Figure 6:
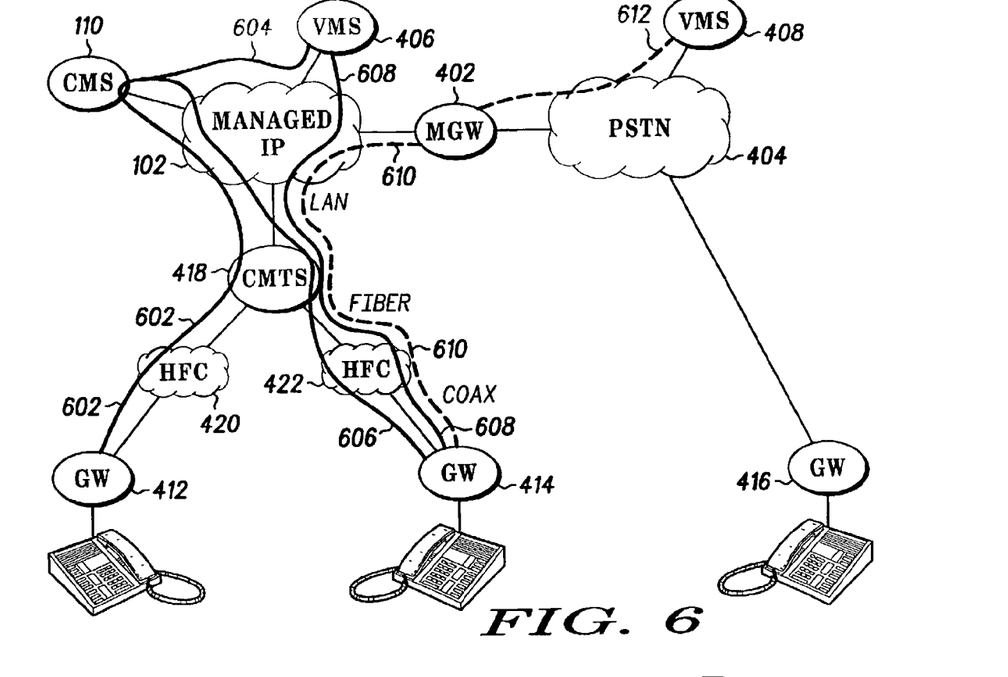
FIG. 6 is the system level diagram of FIG. 4 illustrating a call scenario from an originating gateway within the IP network of FIG. 4 to a terminating gateway also within the IP network in accordance with a further embodiment of the invention.
Figure 7:
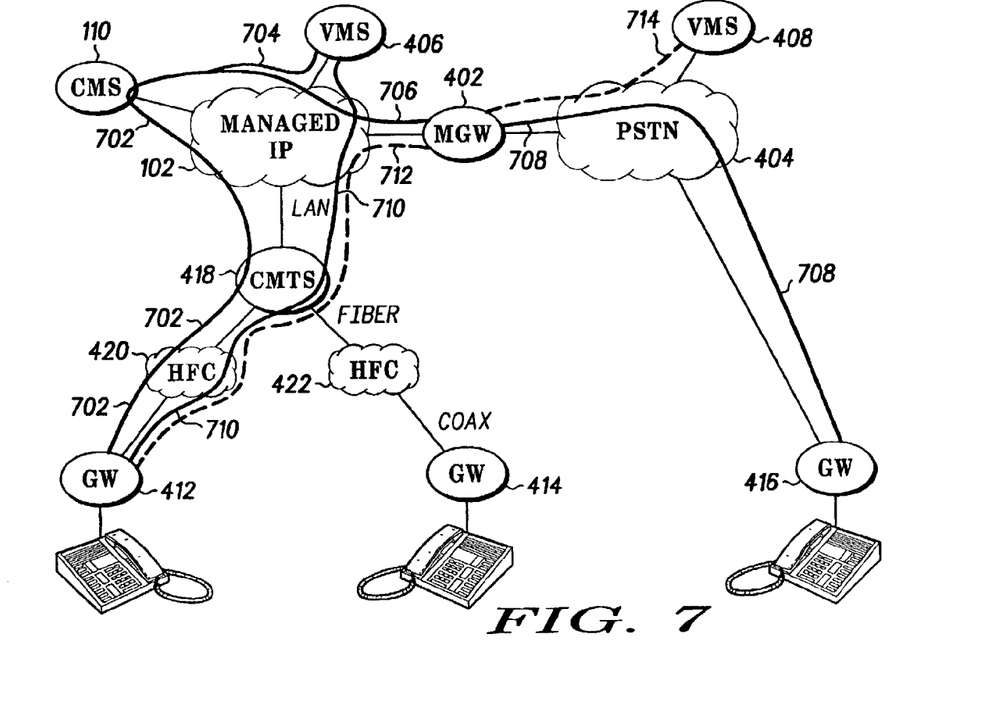
FIG. 7 is the system level diagram of FIG. 4 illustrating a call scenario from an originating gateway within the IP network of FIG. 4 to a terminating gateway outside of the IP network in accordance with yet another embodiment of the invention.

Referring next to FIGS. 5–7, various call scenarios are shown in which voice calls are placed from a subscriber at an originating gateway to a subscriber at a terminating gateway within the communication system 400 of FIG. 4. The subscriber at the terminating gateway is configured with VMS for voice message support. Furthermore, the system is a centralized call signaling system such that the call setup and call signaling is handled by the CMS 110, although the system may be alternatively be a distributed call signaling system as described above.

Referring next to FIG. 5, the system level diagram of FIG. 4 is shown illustrating a call scenario from an originating gateway external to the packet network of FIG. 4 to a terminating gateway via the packet network in accordance with another embodiment of the invention. In addition to the components of FIG. 4, illustrated are signaling paths 502, 504, 506 and 508, voice paths 510 and 512 and alternate voice paths 514 and 516. Signaling path 502 is between the CMS 110 and the terminating gateway 412, signaling path 504 is between the CMS 110 and the voice messaging system 406, signaling path 506 is between the CMS 110 and the media gateway 402, and signaling path 508 is between the media gateway 402 and the originating gateway 416. Voice path 510 is from the originating gateway 416 to the media gateway 402 and voice path 512 is from the media gateway 402 to the voice messaging system 406. Alternate voice path 514 is from the originating gateway 416 to the media gateway 402 and alternative voice path 516 is from the media gateway 102 to voice messaging system 408.

This call scenario is an Off-net to On-net call, i.e., the call is from a subscriber outside of the packet network 102 to a subscriber within the packet network 102. In this case, the voice call is from a subscriber at originating gateway 416 to a subscriber at terminating gateway 412. The connection between originating gateway 416 to the media gateway 402 is handled by the circuit switched telephony, and the connection between media gateway 402 and the terminating gateway 412 is handled by the call management system 110 in the packet network 102. The media gateway 402 is the proxy for the originating gateway 416 in the packet network 102. The connection between the media gateway 402 and the terminating gateway 412 will conform to the policies subscribed by the terminating gateway subscriber in the packet network 102 as controlled by the call management system 110. Once the call management system 110 detects that the voice call will go unanswered (via signaling path 502) and determines that the voice call will be re-routed to the voice messaging system 406, the call management system 110 will initiate the appropriate signaling (via signaling paths 504, 506, and 508) to cause the voice call to be transported at a lower priority to the voice messaging system 406 via the packet network 102 (via voice paths 510 and 512).

Advantageously, the voice path connection between the media gateway 402 and the voice messaging system 406 will be set up to use compressed codec (in some embodiments) and low priority packet data transfer. The reconnection setup will be done by a call management system application, for example, when it does not detect an offhook from the terminating gateway 412 after the specified number of rings. The call management system 110 will modify the connection from the media gateway 402 to the terminating gateway 412 such that the connection is from the media gateway 402 to the voice messaging system 406 using the supported signaling protocol and set up the connection between voice messaging system 406 and media gateway 402 using the compressed codec and low priority packet marking. In this scenario all the voice packets to the voice messaging system 406 will be compressed and be transported at a reduced priority level in accordance with one embodiment of the invention.

A premium voice call from the originating gateway 416 to the terminating gateway 412 may use 64 Kbs, i.e., 711 CODEC (COderDECoder) without compression which is well known in the art. However, as stated above, in some embodiments, once the voice call is re-routed to the voice messaging system, the voice call is also compressed. Such compression standards such as 726 CODEC or 728 CODEC may be used, as are known in the art.

Furthermore, an alternate voice path may be established to voice messaging system 408, which is part of the circuit switched network (PSTN 404), however, such voice call no longer is required to be re-prioritized since the voice call now is not transported over the packet network 102 at all. As such, the voice call over alternate voice paths 514 and 516 is now an Off-net to Off-net call.

Referring next to FIG. 6, the system level diagram of FIG. 4 is shown illustrating a call scenario from an originating gateway within the IP network of FIG. 4 to a terminating gateway within the IP network in accordance with a further embodiment of the invention. In addition to the components of the FIG. 4, illustrated are signaling paths 602, 604 and 606, voice path 608 and alternate voice paths 610 and 612. Signaling path 602 is between the CMS 110 and the terminating gateway 412, signaling path 604 is between the CMS 110 and the voice messaging system 406, and signaling path 606 is between the CMS 110 and the originating gateway 414. Voice path 608 is from the originating gateway 414 to the voice messaging system 406. Alternate voice path 610 is from the originating gateway 414 to the media gateway 402 and alternative voice path 612 is from the media gateway 402 to voice messaging system 408.

This call scenario is an On-net to On-net call, i.e., the call is from a subscriber within the packet network 102 to another subscriber within the packet network 102. In this case, the voice call is from a subscriber at originating gateway 414 to a subscriber at terminating gateway 412. All connections within the packet network 102 are handled by the call management system 110. In this scenario, there will be a greater need for resources as the voice packets have to be transported over both the HFC networks 420 and 422 as well as the managed IP network (i.e., the packet network 102). The bandwidth over the HFC networks 420 and 422 is premium. Thus, re-prioritizing voice calls that terminate at the voice messaging system 406 to a lower priority level will greatly increase the available bandwidth of the packet network 102 and the access network 410 to handle other high priority voice calls and data transfers. Furthermore, compression of these re-routed voice calls in addition to the reprioritization will further improve the available system resources. Once the CMS 110 detects that the voice call will go unanswered either by detecting a ring timeout or the absence of an offhook within the prescribed number of rings (via signaling path 602) and determines that the voice call will be re-routed to the voice messaging system 406 (depending on the services provided to the terminating subscriber), the CMS 110 will initiate the appropriate signaling (via signaling paths 604 and 606) to cause the voice call to be transported at a lower priority to the voice messaging system 406 via the packet network 102 (via voice path 608). Again, in this scenario all the voice packets to the voice messaging system 406 will be compressed and be transported at a reduced priority level in accordance with one embodiment of the invention. Furthermore, any suitable compression standard may be used to compress the voice call; however, the voice messaging system should have a compatible decoder to decompress the voice call.

Note that the CMS 110 will set up the connection between the originating gateway 414 and the voice messaging system 406 depending on the its location. For example, with respect to voice messaging system 408, which is in PSTN 404, the CMS 110 will setup the connection from the originating gateway 414 to the media gateway 402 (i.e., alternate voice path 610). Then the media gateway 402 is responsible for setting the connection to from the media gateway 402 to the voice messaging system 408 over PSTN 404 (i.e., alternate voice path 612). Otherwise, the CMS 110 handles setting up the connection from the originating gateway 414 to the voice messaging system 406, which is in the packet network 102.

Referring next to FIG. 7, the system level diagram of FIG. 4 is shown illustrating a call scenario from an originating gateway within the IP network of FIG. 4 to a terminating gateway outside of the IP network in accordance with yet another embodiment of the invention. In addition to the 702, 704, 706 and 708, voice path 710 and alternate voice paths 712 and 714. Signaling path 702 is between the CMS 110 and the originating gateway 412, signaling path 704 is between the CMS 110 and the voice messaging system 406, signaling path 706 is between the CMS 110 and the media gateway 402, and signaling path 708 is from the media gateway 402 to the terminating gateway 416. Voice path 710 is from the originating gateway 412 to the voice messaging system 406. Alternate voice path 712 is from the originating gateway 412 to the media gateway 402 and alternative voice path 714 is from the media gateway 402 to voice messaging system 408.

This call scenario is an On-net to Off-net call, i.e., the call is from a subscriber within the packet network 102 to another subscriber outside of the packet network 102, e.g., within the PSTN 404. In this case, the voice call is from a subscriber at originating gateway 412 to a subscriber at terminating gateway 416. Again, all connections within the packet network 102 are handled by the CMS 110. As with the scenario of FIG. 6, in this scenario, there will be a greater need for resources as the voice packets have to be transported over both the HFC networks 420 and 422 as well as the managed IP network (i.e., the packet network 102). The bandwidth over the HFC networks 420 and 422 is premium. Thus, re-prioritizes voice calls that terminate at the voice messaging system 406 to a lower priority level will greatly increase the available bandwidth of the packet network 102 and the access network 410 to handle other high priority voice calls and data transfers. Furthermore, compression of these re-routed voice calls in addition to the reprioritization will further improve the available system resources. Once the call management system 110 detects that the voice call will go unanswered either by detecting a ring timeout or the absence of an offhook within the prescribed number of rings (via signaling path 702) and determines that the voice call will be re-routed to the voice messaging system 406 (depending on the services provided to the terminating subscriber), the CMS 110 will initiate the appropriate signaling (via signaling paths 704 and 706) to cause the voice call to be transported at a lower priority to the voice messaging system 406 via the packet network 102 (via voice path 710). Again, in this scenario all the voice packets to the voice messaging system 406 will be compressed and be transported at a reduced priority level in accordance with one embodiment of the invention. Furthermore, any suitable compression standard may be used to compress the voice call; however, the voice messaging system should have a compatible decoder to decompress the voice call.

As with the scenario of FIG. 6, notice that the CMS 110 will set up the connection to the VMS 406 depending on the its location. For example, with respect to voice messaging system 408, which is in PSTN 404, the CMS 110 will setup the connection from the originating gateway 412 to the media gateway 402 (i.e., alternate voice path 712). Then the media gateway 402 is responsible for setting the connection from the media gateway 402 to the voice messaging system 408 over PSTN 404 (i.e., alternate voice path 714). Otherwise, the CMS 110 handles setting up the connection from the originating gateway 412 to the voice messaging system 406, which is in the packet network 102.

It is understood that the embodiments as shown in FIGS. 4 through 7 represent several specific embodiments of the invention. It should be noted that the packet network 102 is shown with an access network 410 comprising the hybrid fiber/coax networks 420 and 422. However, other such access networks are contemplated, as well as the absence of an access network (i.e., the originating and terminating gateways are integral to the packet network 102 without an intermediate access network 410. Furthermore, a non-human voice interface system is embodied within FIGS. 4 through 7 as a voice messaging system; however, may comprise other systems in which a voice call terminates to which the call is not required to be received in a real time or a high priority level. Additionally, it is not required that the non-human voice interface system be at a separate physical location than the subscriber at the terminating gateway. It should also be noted that the embodiments as shown in FIGS. 4 through 7 may use the methods as described in FIGS. 2 and 3. Furthermore, as described above, the technique of reprioritizing voice calls that terminate at a non-human voice interface system may be applied selectively to only certain subscribers (e.g, those subscribers who have acquired such services) or may be applied automatically to all voice calls within the packet network 102.

While the invention herein disclosed has been described by means of specific embodiments and applications thereof, numerous modifications and variations could be made thereto by those skilled in the art without departing from the scope of the invention set forth in the claims.

What is claimed is:

1. A method of optimizing system resources in a network using packetized voice telephony comprising:
   determining that a packetized voice call from an originating gateway terminates at a non-human voice interface system, wherein the packetized voice call is assigned a specified high priority level;
   determining that the packetized voice call has not been answered at a terminating gateway intended to be a terminating end of the packetized voice call within a prescribed number of rings at the terminating gateway; and
   responsively transmitting signaling to cause the originating gateway to transmit the packetized voice call to the non-human voice interface system at a lower priority than the specified high priority level.

2. The method of claim 1 wherein the non-human voice interface system comprises a voice messaging system.

3. The method of claim 1 wherein the non-human voice interface system comprises an interactive voice response system.

4. The method of claim 1 further comprising transmitting signaling to cause the originating gateway to compress the packetized voice call.

5. The method of claim 1 wherein the specified high priority level comprises a real time priority level to ensure that the packetized voice call will occur substantially in real time.

6. The method of claim 1 wherein the determining that the packetized voice call has not been answered at a terminating gateway comprises detecting whether an absence of an offhook at the terminating gateway within the prescribed number of rings at the terminating gateway.

7. The method of claim 1 wherein the responsively transmitting step comprises automatically transmitting the signaling to cause the originating gateway to transmit the packetized voice call to the non-human voice interface system at the lower priority than the specified high priority level.

8. The method of claim 1 wherein the responsively transmitting step comprises selectively transmitting the signaling to cause the originating gateway to transmit the packetized voice call to the non-human voice interface system at the lower priority than the specified high priority level.

9. A system for optimizing system resources in a network using packetized voice telephony comprising:
   means for determining that a packetized voice call from an originating gateway terminates at a non human voice interface system, wherein the packetized voice call is assigned a specified high priority level;
   means for determining that the packetized voice call has not been answered at a terminating gateway intended to be a terminating end of the packetized voice call within a prescribed number of rings at the terminating gateway; and
   means for responsively transmitting signaling to cause the originating gateway to transmit the packetized voice call to the non-human voice interface system at a lower priority than the specified high priority level.

10. The system of claim 9 further comprising means for transmitting signaling to cause the originating gateway to compress the packetized voice call.

11. The system of claim 9 wherein the means for responsively transmitting comprises means for automatically transmitting the signaling to cause the originating gateway to transmit the packetized voice call to the non-human voice interface system at the lower priority than the specified high priority level.

12. The system of claim 9 wherein the means for transmitting comprises means for responsively transmitting the signaling to cause the originating gateway to transmit the packetized voice call to the non human voice interface system at the lower priority than the specified high priority level.

* * * * *